United States Patent
Li-On et al.

(10) Patent No.: US 9,769,062 B2
(45) Date of Patent: *Sep. 19, 2017

(54) LOAD BALANCING INPUT/OUTPUT OPERATIONS BETWEEN TWO COMPUTERS

(71) Applicant: INTERNATIONAL BUSINESS MACHINES CORPORATION, Armonk, NY (US)

(72) Inventors: Oren Li-On, Ramat-Gan (IL); Orit Nissan-Messing, Hod HaSharon (IL); Eyal Perek, Petach Tikva (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 425 days.

This patent is subject to a terminal disclaimer.

(21) Appl. No.: 13/916,254

(22) Filed: Jun. 12, 2013

(65) Prior Publication Data
US 2014/0372549 A1    Dec. 18, 2014

(51) Int. Cl.
G06F 15/167 (2006.01)
H04L 12/707 (2013.01)
H04L 29/08 (2006.01)

(52) U.S. Cl.
CPC .......... *H04L 45/24* (2013.01); *H04L 67/1004* (2013.01); *H04L 67/1097* (2013.01)

(58) Field of Classification Search
CPC ....... H04L 47/125; H04L 45/00; H04L 45/24; H04L 67/1004; H04L 67/1097;
(Continued)

(56) References Cited

U.S. PATENT DOCUMENTS 6,209,023 B1   3/2001   Dimitroff et al.
6,356,977 B2   3/2002   Ofek et al.
(Continued)

FOREIGN PATENT DOCUMENTS

EP   2557494 A1   2/2013

OTHER PUBLICATIONS

Bigang et al., "Design and Implementation of a Storage Virtualization System Based on SCSI Target Simulator in SAN," Tsinghua Science and Technology, v. 10, n. 1, p. 122-127.

*Primary Examiner* — Tonia L Dollinger
*Assistant Examiner* — Kristoffer S Sayoc
(74) *Attorney, Agent, or Firm* — Griffiths & Seaton PLLC (57) ABSTRACT

Methods, apparatus and computer program products implement embodiments of the present invention that include identifying, by a first computer, multiple network paths to a second computer, and splitting an input/output (I/O) request for a logical volume stored on the second computer into sub-requests. A probe request defining an association between the I/O request and the sub-requests is conveyed to the second computer, and each of the sub-requests is assigned to a respective one of the multiple network paths. Each of the sub-requests are conveyed to the second computer via the assigned respective one of the multiple network paths, and the sub-requests are received by the second computer via the multiple network paths. The second computer performs the sub-requests in response to the association, and a result of each of the sub-requests is conveyed to the first computer via the assigned respective one of the multiple network paths.

17 Claims, 3 Drawing Sheets

(58) Field of Classification Search
CPC ...... G06F 3/067; G06F 3/0635; G06F 3/0659; G06F 3/0665; G06F 3/0689
USPC .......................................... 709/201, 224, 213
See application file for complete search history.

(56) References Cited

U.S. PATENT DOCUMENTS

| | | | |
|---|---|---|---|
| 6,400,730 B1 | 6/2002 | Latif et al. | |
| 6,405,294 B1 | 6/2002 | Hayter | |
| 6,557,048 B1 | 4/2003 | Keller et al. | |
| 6,718,402 B1 | 4/2004 | Arroyo | |
| 6,915,354 B1 | 7/2005 | Ozdemir et al. | |
| 6,922,761 B2 | 7/2005 | O'Connell et al. | |
| 6,934,799 B2 | 8/2005 | Acharya et al. | |
| 6,976,103 B1 | 12/2005 | Watanabe et al. | |
| 7,103,712 B2 | 9/2006 | Mizuno | |
| 7,173,929 B1 | 2/2007 | Testardi | |
| 7,191,304 B1 | 3/2007 | Cameron et al. | |
| 7,209,981 B1 * | 4/2007 | Wade | G06F 3/0626 710/300 |
| 7,321,925 B2 | 1/2008 | Trethewey | |
| 7,340,639 B1 | 3/2008 | Lee et al. | |
| 7,409,442 B2 | 8/2008 | Basham et al. | |
| 7,577,169 B1 | 8/2009 | Dinh et al. | |
| 7,594,024 B2 | 9/2009 | Shah et al. | |
| 7,610,467 B2 | 10/2009 | Mimatsu et al. | |
| 7,634,588 B2 | 12/2009 | Okada et al. | |
| 7,640,408 B1 | 12/2009 | Halligan et al. | |
| 7,668,981 B1 | 2/2010 | Nagineni et al. | |
| 7,707,151 B1 | 4/2010 | Blumenau et al. | |
| 7,757,055 B2 | 7/2010 | Tsukada et al. | |
| 7,778,157 B1 | 8/2010 | Tawri et al. | |
| 7,904,681 B1 | 3/2011 | Bappe et al. | |
| 7,937,617 B1 | 5/2011 | Nagineni et al. | |
| 8,028,110 B1 | 9/2011 | Wigmore | |
| 8,060,710 B1 | 11/2011 | Don et al. | |
| 8,086,896 B2 | 12/2011 | Allen et al. | |
| 8,122,225 B2 | 2/2012 | Recio et al. | |
| 8,160,070 B2 | 4/2012 | Dai et al. | |
| 8,166,163 B2 | 4/2012 | Ma et al. | |
| 8,230,187 B1 | 7/2012 | Krinke, II et al. | |
| 8,254,388 B2 | 8/2012 | Kikuchi et al. | |
| 8,270,420 B2 | 9/2012 | Wang et al. | |
| 8,301,812 B1 | 10/2012 | Riordan et al. | |
| 8,359,379 B1 | 1/2013 | Sen | |
| 8,370,588 B2 | 2/2013 | Nakajima et al. | |
| 8,380,852 B2 | 2/2013 | Allen et al. | |
| 8,386,610 B2 | 2/2013 | Yahalom et al. | |
| 8,417,895 B1 | 4/2013 | De La Iglesia | |
| 8,429,446 B2 | 4/2013 | Hara et al. | |
| 8,601,220 B1 | 12/2013 | Corbin et al. | |
| 8,713,356 B1 | 4/2014 | Chan et al. | |
| 8,819,317 B1 | 8/2014 | Li-On et al. | |
| 8,904,050 B1 | 12/2014 | Raizen et al. | |
| 2002/0071386 A1 * | 6/2002 | Gronke | H04L 45/00 370/217 |
| 2002/0073297 A1 | 6/2002 | Mizuno et al. | |
| 2002/0193146 A1 * | 12/2002 | Wallace | H04B 7/0417 455/562.1 |
| 2002/0194407 A1 | 12/2002 | Kim | |
| 2003/0067890 A1 * | 4/2003 | Goel | H04L 1/1685 370/310.1 |
| 2003/0212785 A1 | 11/2003 | Jibbe | |
| 2005/0071577 A1 * | 3/2005 | Dias | G06F 9/4881 711/151 |
| 2005/0157730 A1 | 7/2005 | Grant et al. | |
| 2005/0210144 A1 | 9/2005 | Kumagai et al. | |
| 2006/0291392 A1 * | 12/2006 | Alicherry | H04L 45/02 370/235 |
| 2007/0168396 A1 | 7/2007 | Adams et al. | |
| 2008/0270564 A1 | 10/2008 | Rangegowda et al. | |
| 2009/0037638 A1 | 2/2009 | Izuta et al. | |
| 2009/0094428 A1 | 4/2009 | Nagata et al. | |
| 2009/0213736 A1 * | 8/2009 | Liu | H04L 67/1097 370/236 |
| 2009/0292834 A1 | 11/2009 | Neemidge et al. | |
| 2010/0011114 A1 | 1/2010 | Thomas et al. | |
| 2010/0070722 A1 | 3/2010 | Otani et al. | |
| 2010/0161843 A1 | 6/2010 | Spry | |
| 2010/0185794 A1 | 7/2010 | Belyakov et al. | |
| 2010/0262772 A1 | 10/2010 | Mazina | |
| 2011/0004707 A1 | 1/2011 | Spry et al. | |
| 2011/0179414 A1 | 7/2011 | Goggin et al. | |
| 2011/0239014 A1 | 9/2011 | Karnowski | |
| 2012/0137098 A1 | 5/2012 | Wang et al. | |
| 2012/0188949 A1 * | 7/2012 | Salkintzis | H04L 45/308 370/329 |
| 2012/0221790 A1 | 8/2012 | Nunez et al. | |
| 2012/0278280 A1 | 11/2012 | Broido et al. | |
| 2012/0278572 A1 | 11/2012 | Broido et al. | |
| 2013/0007364 A1 | 1/2013 | Xiong et al. | |
| 2013/0046949 A1 | 2/2013 | Colgrove et al. | |
| 2013/0067163 A1 | 3/2013 | Velayudhan et al. | |
| 2013/0339647 A1 | 12/2013 | Jindo et al. | |

* cited by examiner

LOAD BALANCING INPUT/OUTPUT OPERATIONS BETWEEN TWO COMPUTERS

CROSS-REFERENCE TO RELATED APPLICATIONS

This application is related to U.S. patent applications titled "Processing Input/Output Requests Using Proxy and Owner Storage Systems", "Impersonating SCSI Ports Via an Intermediate Proxy", "Safe Mapping and Unmapping of Host SCSI Volumes", "Unit Attention Processing in Proxy and Owner Storage Systems" and "Online Migration of a Logical Volume Between Storage Systems" filed on even date with the present application, and which is incorporated herein by reference.

FIELD OF THE INVENTION

The present invention relates generally to storage systems, and specifically to load balancing input/output operations between two computers.

BACKGROUND

In a storage area network (SAN), remote computer storage devices such as disk arrays can be made accessible to host computers so that the storage devices appear as if they are locally attached to the host computer's operating system. SANs may be implemented using Small Computer System Interface (SCSI) storage devices, in which SCSI protocol entities perform input/output (I/O) operations (e.g., data reads and writes) are exposed through a unique identifier (Logical Unit Identifier—LUN) on a path. A given LUN typically corresponds to a logical volume, and may be represented within the host computer's operating system as a device. Interaction with a LUN is initiated by a SCSI initiator port on a host computer, which can issue various I/O request types to the LUN on a target data storage device.

The description above is presented as a general overview of related art in this field and should not be construed as an admission that any of the information it contains constitutes prior art against the present patent application.

SUMMARY

There is provided, in accordance with an embodiment of the present invention a method, including identifying, by a first computer, multiple network paths to a second computer, splitting an input/output (I/O) request for a logical volume stored on the second computer into sub-requests, conveying, to the second computer, a probe request defining an association between the I/O request and the sub-requests, assigning each of the sub-requests to a respective one of the multiple network paths, conveying each of the sub-requests to the second computer via the assigned respective one of the multiple network paths, receiving, by the second computer via the multiple network paths, the sub-requests, and performing, by the second computer, the sub-requests in response to the association.

There is also provided, in accordance with an embodiment of the present invention a storage facility, including a storage area network (SAN) having multiple network paths, a first computer comprised in the SAN and having multiple local ports and configured, to split an input/output (I/O) request for a remote logical volume into sub-requests, to convey a probe request defining an association between the I/O request and the sub-requests, to assign each of the sub-requests to a respective one of the multiple network paths, and to convey each of the sub-requests to the remote volume via the assigned respective one of the multiple network paths, and a second computer comprised in the SAN and having multiple remote ports and configured, to store the remote logical volume, to receive the probe request, to receive the sub-requests via the multiple network paths, and to perform the sub-requests in response to the association.

There is further provided, in accordance with an embodiment of the present invention a computer program product, the computer program product including a non-transitory computer readable storage medium having computer readable program code embodied therewith, the computer readable program code including computer readable program code configured to identify, by a first computer, multiple network paths to a second computer, computer readable program code configured to split an input/output (I/O) request for a logical volume stored on the second computer into sub-requests, computer readable program code configured to convey, to the second computer, a probe request defining an association between the I/O request and the sub-requests, computer readable program code configured to assign each of the sub-requests to a respective one of the multiple network paths, computer readable program code configured to convey each of the sub-requests to the second computer via the assigned respective one of the multiple network paths, computer readable program code configured to receive, by the second computer via the multiple network paths, the sub-requests, and computer readable program code configured to perform, by the second computer, the sub-requests in response to the association.

BRIEF DESCRIPTION OF THE DRAWINGS

The disclosure is herein described, by way of example only, with reference to the accompanying drawings, wherein.

DETAILED DESCRIPTION OF EMBODIMENTS

There may be instances when a first storage system having a high storage utilization is currently storing a logical volume, and a storage administrator wants to migrate the logical volume from the first storage system to a second storage system in order to balance the storage utilization across the storage systems. Embodiments of the present invention provide methods and mechanisms for load balancing input/output (I/O) operations while migrating the logical volume from the first storage system to the second storage system. In embodiments described herein the first storage system may also be referred to as a first computer and the second storage system may also be referred to as second computer, wherein the first and the second computers communicate over a multipath Small Computer System Interface (SCSI) based storage area network (SAN).

In some embodiments, a first computer can communicate with a second computer over a SAN, and the first computer can split an I/O request into multiple sub-requests, convey the sub-requests to the second computer via multiple paths simultaneously. Upon receiving the multiple sub-requests, the second computer can perform the sub-requests. In further embodiments, the second computer can reassemble the I/O request from the multiple sub-requests and perform the I/O request.

Figure 1:
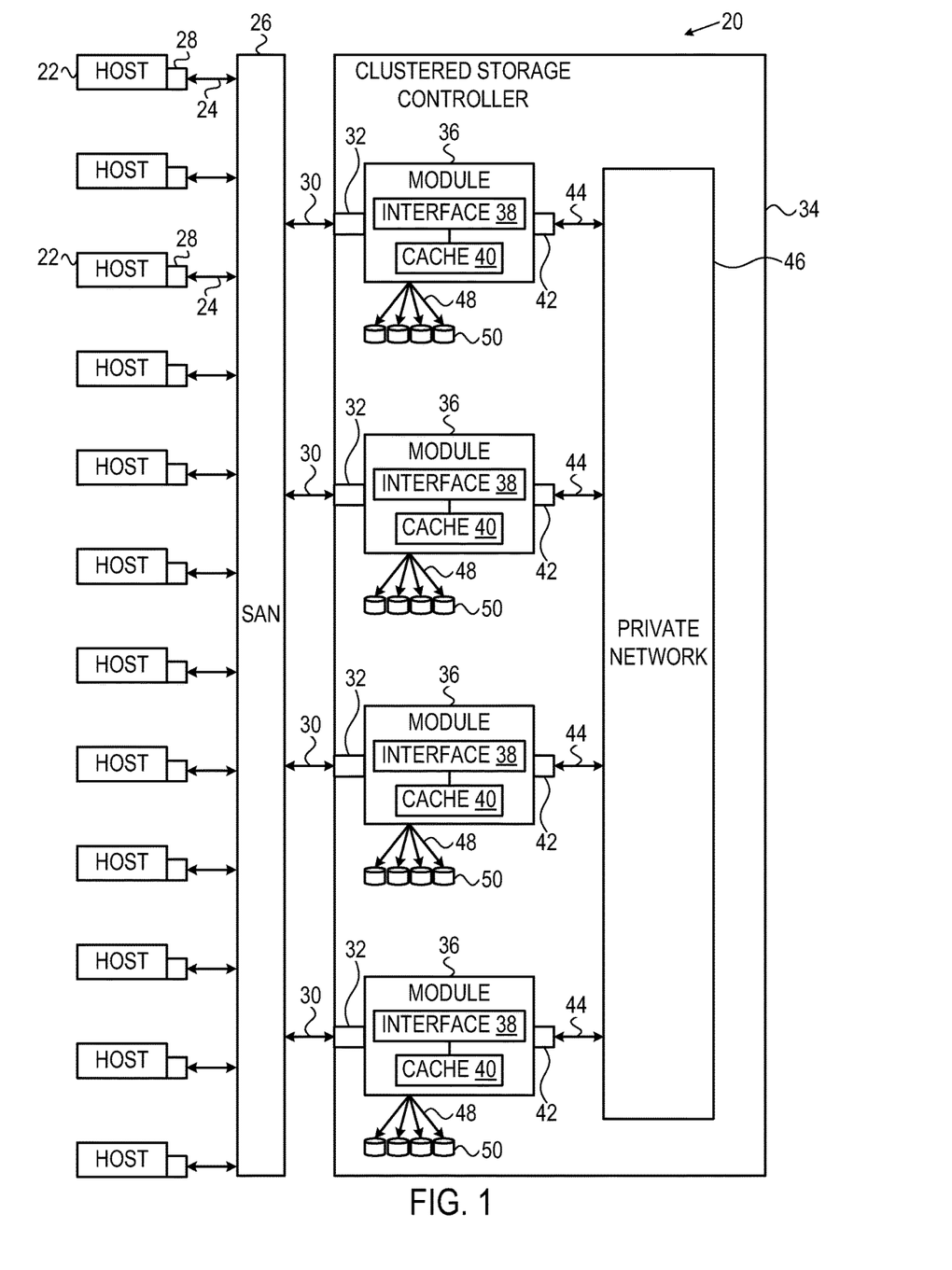
FIG. 1 is a block diagram that schematically illustrates a storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Examples of adapters 32 and 42 include switched fabric adapters such as Fibre Channel (FC) adapters, Internet Small Computer System Interface (iSCSI) adapters, Fibre Channel over Ethernet (FCoE) adapters and Infiniband™ adapters.

Figure 2:
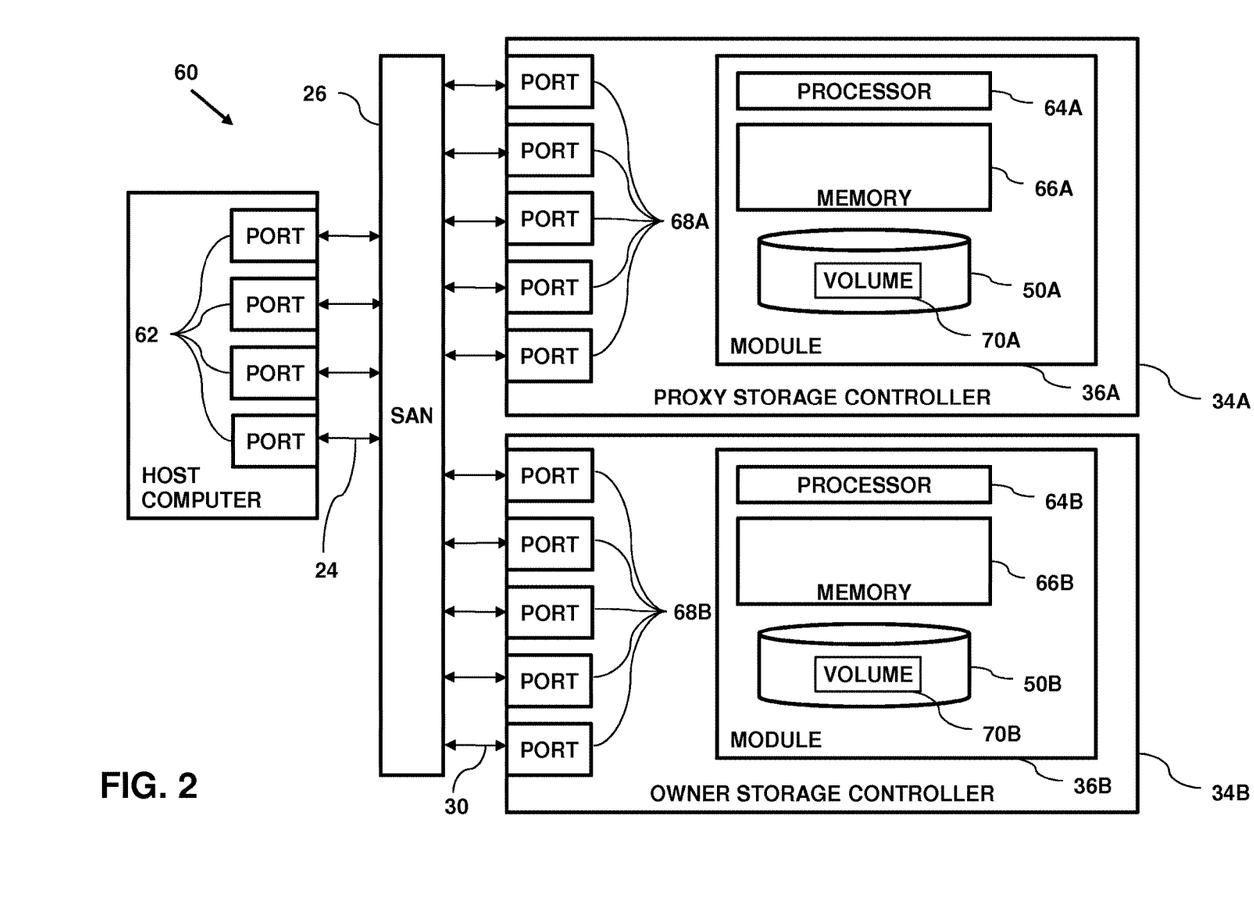
FIG. 2 is a block diagram of a storage facility comprising multiple storage systems configured to load balance input/output (I/O) operations, in accordance with an embodiment of the present invention.

FIG. 2 is a block diagram of a storage facility 60 configured to load balance I/O requests between two or more computers such as storage controllers 34, in accordance with an embodiment of the present invention. In the description herein, storage controllers 34 and their respective components may be differentiated by appending a letter to the identifying numeral, so that storage facility 60 comprises controllers 34A and 34B comprised in the SAN. In embodiments herein, storage controller 34A may also be referred to as a first storage controller 34 or as a proxy storage controller 34, and storage controller 34B may also be referred to as a second storage controller 34 or an owner storage controller 34.

Host computer 12 communicates with SAN 26 via SCSI ports 62. Module 36 comprises a processor 64 and a memory 66, and communicates with SAN 26 via SCSI ports 68. Ports 68A may also be referred to herein as local ports, and ports 68B may also be referred to herein as remote ports. In some embodiments SCSI ports 68 may be configured within module 36. While for purposes of illustrative simplicity, the configuration in FIG. 2 shows module 36 comprising a single storage device 50 storing a single logical volume 70, module 36 typically comprises multiple storage devices 50 storing multiple logical volumes 70. Additionally, a given logical volume 70 may be stored across multiple storage devices 50 in a given storage controller 34.

In operation, SAN 26 can be configured to support concurrent multipath routing, thereby enabling host computer 12 and storage controllers 34A and 34B to communicate with each other over multiple paths simultaneously in order to optimize bandwidth and fault tolerance. While embodiments herein describe load balancing I/O operations between storage controllers 34A and 34B, load balancing I/O operations between any two computers communicating over a multipath connection is considered to be within the spirit and scope of the present invention.

SAN 26 has at least two network paths defined as follows:
A first communication path on SAN 26 between a first port 68A and a specific port 68B.
A second communication path on SAN 26 between a second port 68A and the specific port 68B.

Processor 64 typically comprises a general-purpose central processing unit (CPU), which is programmed in software to carry out the functions described herein. The software may be downloaded module 36 in electronic form, over a network, for example, or it may be provided on non-transitory tangible media, such as optical, magnetic or electronic memory media. Alternatively, some or all of the functions of processor 64 may be carried out by dedicated or programmable digital hardware components, or using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/actions specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the functions/actions specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/actions specified in the flowchart and/or block diagram block or blocks.

LOAD BALANCING

Figure 3:
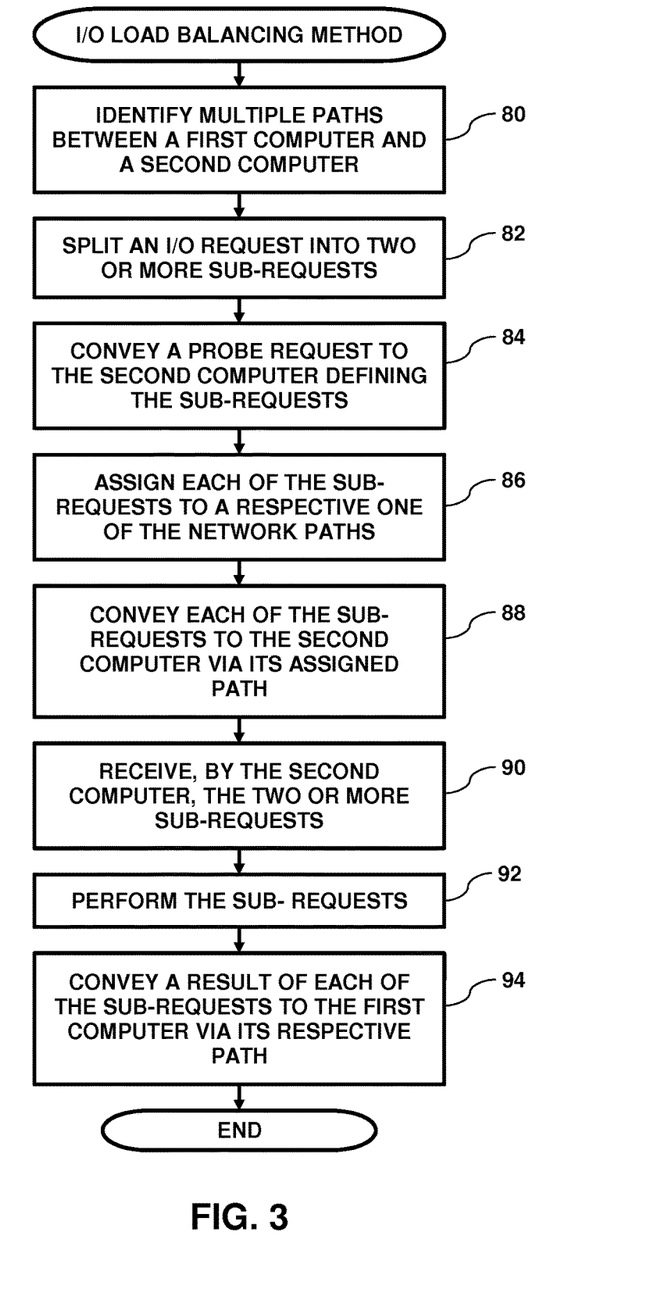
FIG. 3 is a flow diagram that schematically illustrates a method for load balancing I/O operations, in accordance with an embodiment of the present invention.

FIG. 3 is a flow diagram that schematically illustrates a method for load balancing I/O operations between storage controllers 34A and 34B, in accordance with an embodiment of the present invention. In an identification step 80, processor 64A identifies multiple paths (also referred to herein as network paths) over SAN 26 between storage controller 34A and storage controller 34B, and in a split step 82, processor 64A splits an I/O request for logical volume 70B into two or more sub-requests. Examples of I/O requests that can be split using embodiments of the present invention include requests to read data from logical volume 70B and a request to write data to logical volume 70B. In embodiments described herein, logical volume 70B may also be referred to as remote volume 70.

In a first convey step 84, processor 64A conveys a probe request to processor 64B. The probe request typically includes a header such as a SCSI command description block (CDB), and can define an association between the I/O request and the sub-requests. For example, the probe request may include a count of the sub-requests. In some embodiments, the probe request can verify an availability of volume 70B for the I/O request. In other words, upon processor 64B receiving the probe request, processor 64B can verify the availability of volume 70B for the I/O request. For example, volume 70B may currently be reserved by a different host computer 12, or volume 70B may have a read-only status and the I/O request may be for a write operation.

Since the I/O request can be divided into multiple sub-requests, the probe request also enables processors 64A and/or 64B to detect when the I/O operation indicated by the I/O request is complete, and the volume is consistent. For example, prior to taking a snapshot of volume 70B, processor 64 can verify that any pending sub-requests are completed, thereby ensuring volume integrity.

In an assign step 86, processor 64A assigns each of the sub-requests a respective one of the identified multiple paths. In some embodiments, processor 64A can base then assignment of the paths based on a load status of remote ports 68B.

In a second convey step 88, processor 64A conveys each of the two or more sub-requests to storage controller 34B via the assigned respective one of the multiple network paths. In the example described in the flow diagram, processor 64A conveys a probe request prior to conveying the sub-requests. In some embodiments, processor 64A can incorporate the probe request into the first sub-request conveyed to processor 64B.

In a receive step 90, processor 64B receives the sub-requests via port 68B, and in a perform step 92, processor 64B performs the two or more sub-requests in response to the association (i.e., from step 84). In some embodiments, performing the two or more sub-requests comprises processor 64B reassembling the sub-requests into the I/O request, and performing the I/O request. In some embodiments, each of the sub-requests may include a respective serial number that processor 64B can utilize in order to reassemble the I/O request in the correct order.

Finally, in a completion step 94, processor 64B conveys a result of each of the sub-requests to processor 64A via the assigned respective one of the multiple network paths, and the method ends.

If the I/O request comprises a read request, then the result of each of the sub-requests comprises a subset of the data read from the logical volume, and processor 64A can combine the subsets of the data received in the results of the sub-requests. For example, if the I/O request comprises a request to read one megabyte bloc of data from volume 70B, processor 64A can split the I/O request into sixteen sub-requests (in step 82), wherein each sub-request comprises a 64 kilobyte (KB) subset of the block of data. Upon receiving the sixteen 64 KB subsets of the data in response to the read request, processor 64A can combine the received subsets into the requested one megabyte block of data.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
   identifying, by a first computer, multiple network paths to a second computer;
   splitting an input/output (I/O) request for a logical volume stored on the second computer into sub-requests;
   conveying, to the second computer, a probe request defining an association between the I/O request and the sub-requests;
   assigning each of the sub-requests to a respective one of the multiple network paths;
   conveying each of the sub-requests to the second computer via the assigned respective one of the multiple network paths; wherein each one of the sub-requests is individually routed through only the assigned respective one of the multiple network paths;

receiving, by the second computer via the assigned respective one of the multiple network paths, the respective sub-requests; and performing, by the second computer, the sub-requests in response to the association; wherein performing the two or more sub-requests comprises reassembling the sub-requests into the I/O request, and performing the I/O request.

2. The method according to claim 1, wherein probe request verifies an availability of the logical volume for the I/O operation.

3. The method according to claim 1, and comprising, subsequent to performing the sub-requests, conveying a result of each of the sub-requests to the first computer via the assigned respective one of the multiple network paths.

4. The method according to claim 3 wherein the I/O request is selected from a list comprising a request to write data to the logical volume and a request to read data from the logical volume.

5. The method according to claim 4, wherein the I/O request comprises the request to read data from the logical volume, wherein the result of each of the sub-requests comprises a subset of the data read from the logical volume, and comprising combining, by the first computer, the subsets of the data read from the logical volume.

6. The method according to claim 1, wherein a first of the multiple network paths comprises a first communication path on a storage area network (SAN) between a first local port on the first computer and a specific remote port on the second computer, and wherein a second of the multiple network paths comprises a second communication path on the SAN between a second local port on the first computer and the specific remote port on the second computer.

7. A storage facility, comprising:
one or more memories storing instructions executed by one or more processors to provide:
a storage area network (SAN) having multiple network paths;
a first computer comprised in the SAN and having a physical processor device and multiple local ports, the first computer configured:
to split an input/output (I/O) request for a remote logical volume into sub-requests,
to convey a probe request defining an association between the I/O request and the sub-requests,
to assign each of the sub-requests to a respective one of the multiple network paths,
and to convey each of the sub-requests to the remote volume via the assigned respective one of the multiple network paths; wherein each one of the sub-requests is individually routed through only the assigned respective one of the multiple network paths; and
a second computer comprised in the SAN and having multiple remote ports and configured:
to store the remote logical volume,
to receive the probe request,
to receive the respective sub-requests via the assigned respective one of the multiple network paths, and
to perform the sub-requests in response to the association; wherein the second computer is configured to perform the sub-requests by reassembling the sub-requests into the I/O request, and performing the I/O request.

8. The storage facility according to claim 7, wherein probe request verifies an availability of the remote volume for the I/O request.

9. The storage facility according to claim 7, wherein the second computer is configured to convey, subsequent to performing the sub-requests, a result of each of the sub-requests to the first computer via the assigned respective one of the multiple network paths.

10. The storage facility according to claim 9 wherein the I/O request is selected from a list comprising a request to write data to the remote volume and a request to read data from the remote volume.

11. The storage facility according to claim 10, wherein the I/O request comprises the request to read data from the remote volume, wherein the result of each of the sub-requests comprises a subset of the data read from the remote volume, and wherein the first computer is configured to combine the subsets of the data read from the remote volume.

12. The storage facility according to claim 7, wherein a first of the network paths comprises a first communication path on the storage area network (SAN) between a first of the multiple local ports and a specific one of the multiple remote ports, and wherein a second of the multiple network paths comprises a second communication path on the SAN between a second of the multiple local ports and the specific one of the remote multiple ports.

13. A computer program product, the computer program product comprising:
a non-transitory computer readable storage medium having computer readable program code embodied therewith, the computer readable program code comprising:
computer readable program code configured to identify, by a first computer, multiple network paths to a second computer;
computer readable program code configured to split an input/output (I/O) request for a logical volume stored on the second computer into sub-requests;
computer readable program code configured to convey, to the second computer, a probe request defining an association between the I/O request and the sub-requests;
computer readable program code configured to assign each of the sub-requests to a respective one of the multiple network paths;
computer readable program code configured to convey each of the sub-requests to the second computer via the assigned respective one of the multiple network paths; wherein each one of the sub-requests is individually routed through only the assigned respective one of the multiple network paths;
computer readable program code configured to receive, by the second computer via the assigned respective one of the multiple network paths, the respective sub-requests; and
computer readable program code configured to perform, by the second computer, the sub-requests in response to the association; wherein the computer readable program code is configured to perform the sub-requests by reassembling the sub-requests into the I/O request, and performing the I/O request.

14. The computer program product according to claim 13, wherein probe request verifies an availability of the logical volume for the I/O request.

15. The computer program product according to claim 13, and comprising computer readable program code configured to convey, subsequent to performing the sub-requests, a result of each of the sub-requests to the first computer via the assigned respective one of the multiple network paths.

16. The computer program product according to claim 15 wherein the I/O request is selected from a list comprising a request to write data to the logical volume and a request to read data from the logical volume.

17. The computer program product according to claim 16, wherein the I/O request comprises the request to read data from the logical volume, wherein the result of each of the sub-requests comprises a subset of the data read from the logical volume, and comprising computer readable program code configured to combine the subsets of the data read from the logical volume.

\* \* \* \* \*